No. 780,562. PATENTED JAN. 24, 1905.
M. G. GANS.
AUTOMATIC BELT SHIFTER.
APPLICATION FILED APR. 20, 1904.
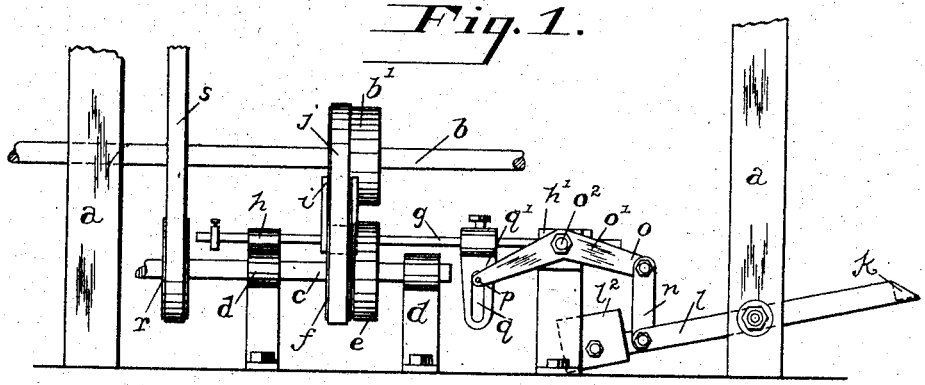
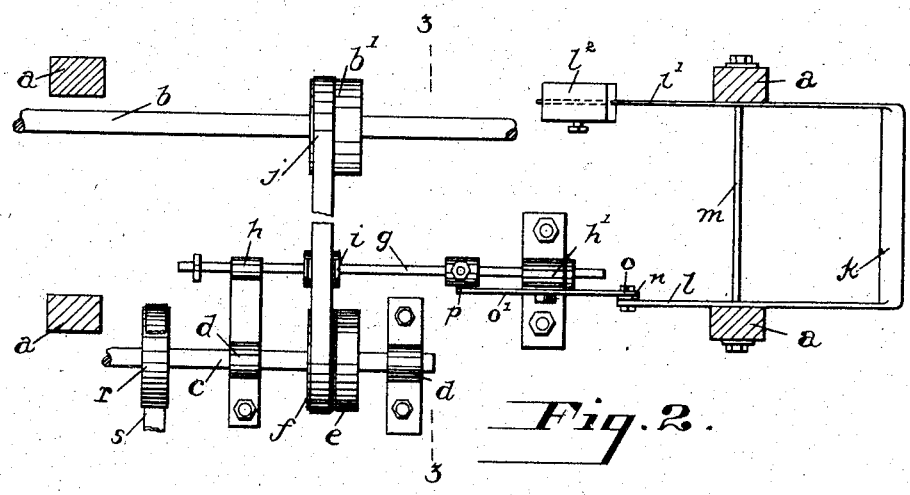
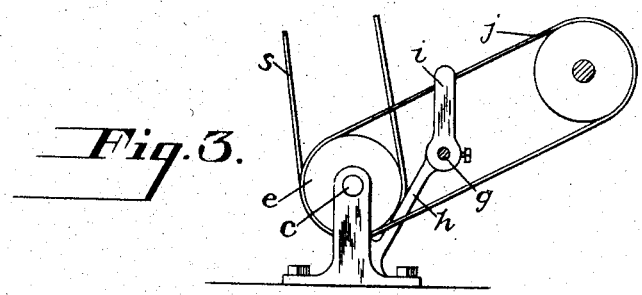
Witnesses:-
S. John Williamson
G. Ferdinand Vogt
Inventor:-
Moses G. Gans
By Mann & Co,
Attorneys:-

No. 780,562. Patented January 24, 1905.

UNITED STATES PATENT OFFICE.

MOSES G. GANS, OF BALTIMORE, MARYLAND.

AUTOMATIC BELT-SHIFTER.

SPECIFICATION forming part of Letters Patent No. 780,562, dated January 24, 1905.

Application filed April 20, 1904. Serial No. 203,977.

*To all whom it may concern:*

Be it known that I, MOSES G. GANS, a citizen of the United States, residing at Baltimore, in the State of Maryland, have invented certain new and useful Improvements in Automatic Belt-Shifters, of which the following is a specification.

This invention relates to an automatic belt-shifter.

The object of the invention is to provide a device for automatically shifting the belts of a machine from the fast to the loose pulley in order to stop the same in case the operator is called away or for any reason leaves the machine.

It often happens in factories and shops that machine operators will leave their machines for various reasons without first shifting the belts and stopping the same, and the machine continues to operate for an indefinite period, consuming and wasting power, besides causing unnecessary wear and sometimes even spoiling a piece of work for lack of attention. The present invention, therefore, is designed to overcome these objections and to work out economies, especially in cases where electricity is the motive power.

With these objects in view the invention is illustrated in the accompanying drawings, in which—

Figure 1 illustrates a side elevation of my improved shifter mechanism. Fig. 2 is a plan view of the same, and Fig. 3 is a vertical section on the line 3 3 of Fig. 2 looking toward the pulleys.

In the drawings, $a$ designates the legs or supports of a stand or table on which a machine is mounted. Beneath the table and extending in a horizontal plane is a driving-shaft $b$, carrying a pulley $b'$. A counter-shaft $c$ is supported in suitable bearings $d$, which latter are secured to the floor, and said shaft $c$ carries the ordinary fast and loose pulleys $e$ and $f$.

A shifter-rod $g$ is supported in stationary bearings $h$ and $h'$ and extends in a horizontal direction parallel with the shaft $c$, and said rod is provided with the ordinary forked arm $i$, which straddles or takes on opposite sides of the driving-belt $j$, which latter passes around the pulley $b'$ and either the fast pulley $e$ or loose pulley $f$.

A treadle $k$ is provided with two parallel arms $l$ and $l'$, which are pivotally mounted in the present instance on a horizontal bar $m$, which projects through the two vertical legs $a$, and said arms extend toward the bearing $h'$. One of these arms, $l'$, carries at its free end a weight or equivalent device $l^2$, which serves to keep the treadle $k$ normally elevated. The end of the other arm, $l$, is connected, by means of a link $n$, with one end $o$ of a bell-crank lever $o'$. This bell-crank lever is pivoted at $o^2$ to the side of the bearing $h'$, and the other end of the bell-crank lever is provided with a laterally-projecting pin $p$, which takes in a slot $q$ of an arm $q'$, which is carried on the shifter-rod $g$ and in the present instance projects downwardly in a vertical direction.

In the drawings the treadle is illustrated in the elevated or normal position, where it is held by means of the weight $l^2$. It is obvious that a spring, the well-known mechanical equivalent for a weight, may be connected to the free end of the arm $l'$ in lieu of the weight.

A pulley $r$ is also carried on the counter-shaft $c$, and a belt $s$ passes around said pulley and is adapted to be passed around a pulley on a machine, (not shown,) but to be supported on the legs $a$.

The operation of the shifter is as follows: When in the normal position when the machine is not running, as illustrated in the drawings, the treadle $k$ is elevated and the driving-belt $j$ extends around the pulley $b'$ on the driving-shaft $b$ and also around the loose pulley $f$ on the counter-shaft $c$. When it is desired to operate the machine, the operator stands on the treadle $k$, which depresses the same, and thereby elevates the connected end of the arm $l$, the link $n$, and the end $o$ of the bell-crank lever. The other end of said bell-crank lever is lowered and has a lateral movement through an arc of a circle. This movement causes the pin $p$ on the bell-crank lever to move through the slot $q$ of the arm $q'$, and thereby draws said arm and the shifter-rod $g$ in a horizontal plane toward the bracket $h$ and carries the forked belt-arm *i* with it and shifts the belt *j* from the loose pulley *f* onto the fast pulley *e*, whereupon the machine starts. When the operator leaves the machine—that is, steps off the treadle—the weight or equivalent device will raise the treadle and reverse the movement of the levers and automatically shift the belt *j* onto the loose pulley *f* and stop the machine.

Having thus fully described my invention, what I claim as new, and desire to secure by Letters Patent, is—

In a belt-shifter mechanism the combination with a shaft; of a fast and loose pulley on said shaft; a slidable shifter-rod provided with a device to engage the belt; a treadle having two arms; a weight on one of the treadle-arms to keep the treadle normally elevated; a bell-crank lever; a link connecting the other treadle-arm with the bell-crank lever, and an arm carried by said slidable shifter-rod with which the bell-crank lever engages.

In testimony whereof I affix my signature in the presence of two witnesses.

MOSES G. GANS.

Witnesses:
 G. FERDINAND VOGT,
 CHARLES B. MANN, Jr.